May 19, 1931. J. N. GOOD 1,805,621
TRAIN CONTROL DEVICE
Filed Feb. 11, 1930
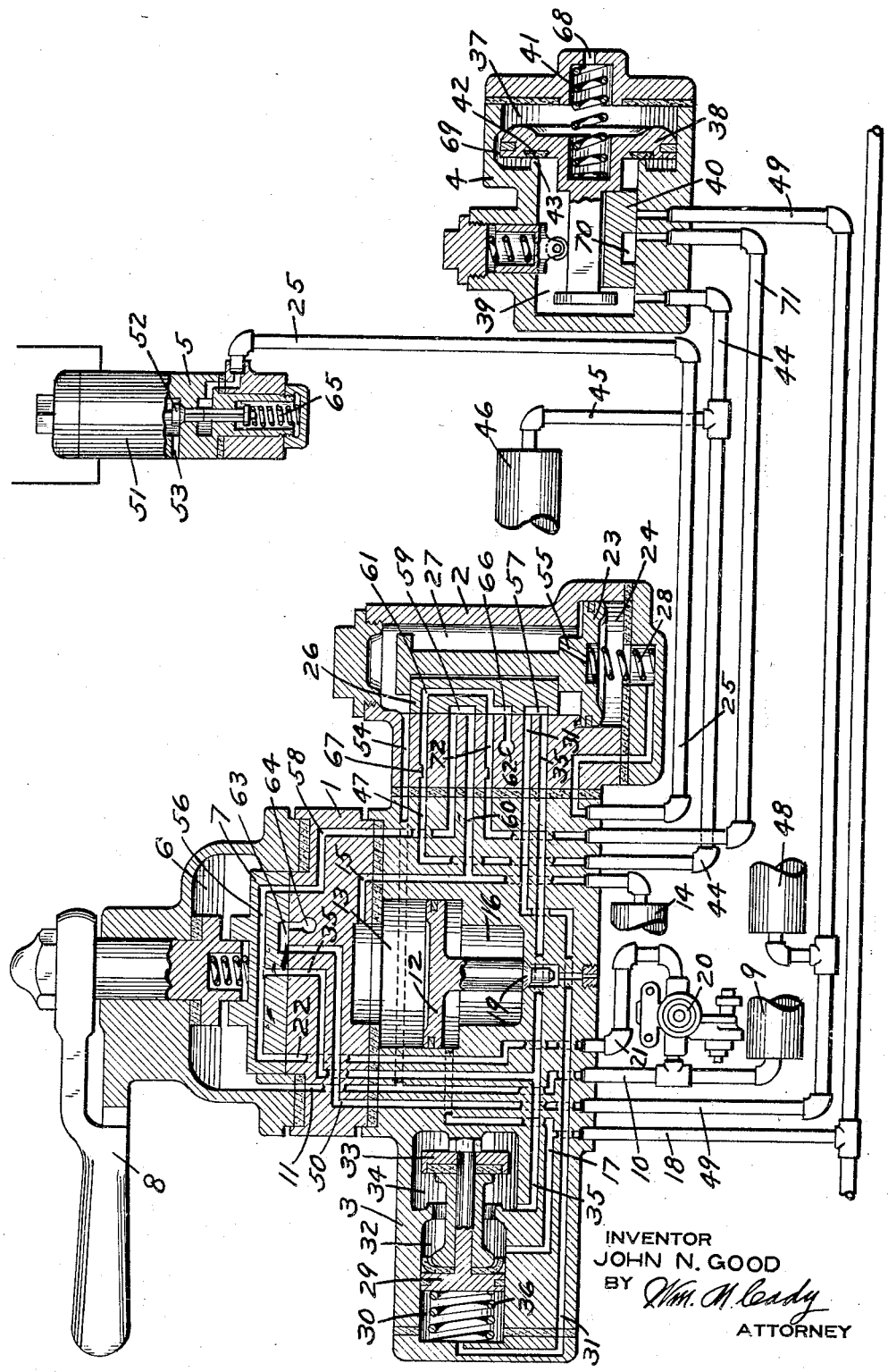
INVENTOR
JOHN N. GOOD
BY Wm. M. Cady
ATTORNEY Patented May 19, 1931

1,805,621

UNITED STATES PATENT OFFICE

JOHN N. GOOD, OF WILMERDING, PENNSYLVANIA, ASSIGNOR TO THE WESTINGHOUSE AIR BRAKE COMPANY, OF WILMERDING, PENNSYLVANIA, A CORPORATION OF PENNSYLVANIA

TRAIN CONTROL DEVICE

Application filed February 11, 1930. Serial No. 427,484.

This invention relates to automatic train control equipments, in which the brakes are automatically applied when the track conditions are unfavorable.

There is usually more or less leakage of fluid from the brake pipe of a fluid pressure brake system, and when the brakes are automatically applied by operation of an automatic train control system, the reduction in brake pipe pressure due to the operation of the train control apparatus plus the reduction in brake pipe pressure due to the leakage of fluid from the brake pipe is liable to cause the brakes to be applied heavily at the front end of the train before the brakes are applied at the rear end, with the result that the slack in the train runs in harshly and tends to produce severe shocks, and possibly a break-in-two of the train.

The principal object of my invention is to provide an automatic train control equipment having means for obviating the above described undesired braking action.

For accomplishing the above object, I provide means for delaying the start of the reduction in brake pipe pressure as effected by the train control apparatus, the brakes being initially applied by the reduction in brake pipe pressure due to leakage from the brake pipe, with the feed of fluid under pressure to the brake pipe cut off.

In the accompanying drawing, the single figure is a diagrammatic view, mainly in section, of a train control apparatus embodying my invention.

The apparatus shown in the drawing comprises an engineer's brake valve device 1, with which may be associated an application valve device 2, and a cut-off valve device 3. There is also provided a delayed application valve device 4 and a control magnet valve device 5.

The brake valve device 1 comprises a casing having a valve chamber 6 containing a rotary valve 7, adapted to be operated by a handle 8. The rotary valve chamber 6 is supplied with fluid under pressure from the usual main reservoir 9, through pipe 10 and passage 11. Contained in the brake valve casing is the usual equalizing discharge valve mechanism comprising a piston 12, having the chamber 13 at one side connected to the usual equalizing reservoir 14, through passage 15, and having the chamber 16 at the opposite side connected to a passage 17, leading to the usual brake pipe 18.

The piston 12 is adapted to operate a discharge valve 19 for venting fluid under pressure from the brake pipe. The usual feed valve device 20 supplies fluid at a reduced pressure through pipe 21 to passage 22, leading to the seat of rotary valve 7.

The application valve device 2 comprises a piston 23, having the piston chamber 24 connected through pipe 25, with the magnet valve device 5. The piston 23 is adapted to operate a slide valve 26 contained in valve chamber 27. A coil spring 28 acts on piston 23 and urges same to the position shown in the drawing.

The cut-off valve device 3 comprises a piston 29 having a chamber 30 at one side, which is connected to a passage 31 leading to the seat of slide valve 26. The chamber 32 at the opposite side of the piston is connected to passage 17. The piston 29 is adapted to operate a valve 33, contained in valve chamber 34, said valve controlling communication from chamber 34 to chamber 32, and the valve chamber 34 being connected to a passage 35, which leads to the seat of the slide valve 26 and also to the seat of rotary valve 7. The piston 29 is subject to the pressure of a coil spring 36, which urges the piston and the valve 33 to open position, as shown in the drawing.

The delayed application valve device 4 comprises a casing having a piston chamber 37 containing a piston 38, and a valve chamber 39, containing a slide valve 40, adapted to be operated by piston 38. A coil spring 41 acts on piston 38 and urges same inwardly to a position in which a seat ring 42 in the piston engages an annular seat rib 43.

A pipe 44 is in constant communication with valve chamber 39 and connected to pipe 44, through pipe 45, is a timing reservoir 46. The pipe 44 communicates with a passage 47, which leads to the seat of slide valve 26. A reduction limiting reservoir 48 is connected to a pipe 49, which leads to the seat of slide valve 40 and said pipe is connected to a passage 50, leading to the seat of rotary valve 7.

The magnet valve device 5 comprises an electro-magnet 51, which is adapted to be controlled by track circuits (not shown), in the usual manner, such that the magnet 51 is energized when the track conditions are favorable, and is deenergized when the track conditions are unfavorable. The magnet 51 is adapted to operate a valve 52 for controlling the venting of fluid under pressure from pipe 25 to an atmospheric vent port 53.

In operation, with the track conditions favorable, and the magnet 51 energized, the valve 52 is held seated, as shown in the drawing. The valve chamber 27 of the application valve device 2 is connected to the main reservoir 9, through passages 11 and 54, so that said chamber is charged with fluid under pressure, and fluid flows from said chamber, through a restricted port 55 in piston 23, to piston chamber 24. The vent from pipe 25 being closed by valve 52, fluid pressures equalize on opposite sides of piston 23, so that the piston 23 is maintained in the position shown in the drawing by spring 28.

With the brake valve handle 8 in running position, as shown in the drawing, passage 22 is connected through cavity 56 in the rotary valve with passage 35. In the release position of slide valve 26, passage 35 is connected through cavity 57, with passage 31, so that chamber 30 is supplied with fluid from the feed valve device 20.

The valve 33 being normally held in open position by piston 29 and the spring 36, fluid at feed valve pressure is also supplied from passage 35 and chamber 34 to chamber 32 and to the brake pipe 18, through passage 17, and since the fluid pressures on opposite sides of piston 29 remain equal, the spring 36 normally maintains the valve 33 in open position.

Fluid at feed valve pressure also flows through cavity 56 in the rotary valve 7 to passage 58, and thence through cavity 59 in slide valve 26 to a passage 60 which leads to passage 15, so that the equalizing reservoir 14 is charged with fluid under pressure.

In the release position of slide valve 26, passage 47 is connected, through cavity 61 in slide valve 26 with an atmospheric exhaust port 62, so that the timing reservoir 46 and the valve chamber 39 of the delayed application valve device 4 are maintained at atmospheric pressure. Pipe 49 and passage 50 are connected, through cavity 63 in rotary valve 7 with atmospheric exhaust port 64, so that the reduction limiting reservoir 48 is normally maintained at atmospheric pressure.

When the track conditions become unfavorable, the magnet 51 is deenergized, and the valve 52 is then unseated by spring 65. Fluid is now vented from pipe 25 and from piston chamber 24, so that piston 23 is shifted to its outer position by the fluid pressure in valve chamber 27. When the engineer is aware that the train control apparatus is about to operate, he should move the brake valve handle 8 to lap position, in which the rotary valve 7 laps all ports.

With the slide valve 26 in application position, passage 31 is connected through foot extension 66 of cavity 61 with exhaust port 62, so that fluid under pressure is vented from chamber 30 of the cut-off valve device. The piston 29 is then shifted by brake pipe pressure in chamber 32, so as to move the valve 33 to its seat and thus cut off the supply of fluid from the feed valve device to the brake pipe.

With the feed of fluid cut off from the brake pipe, leakage from the brake pipe throughout the train will operate to effect an application of the brakes to the extent that the brake pipe pressure is reduced by such leakage. The movement of slide valve 26 to application position uncovers passage 47, so that it is open to valve chamber 27, and consequently the timing reservoir 46 is charged with fluid under pressure at a slow rate, as permitted by the choke port 67 in passage 47.

After a period of time, and when the pressure in the timing reservoir 46 and in valve chamber 39 has been increased sufficiently on the area of the piston 38 within the seat ring 43, to overcome the pressure of spring 41, the piston 38 will be moved from its seat, exposing the full area of the piston to the pressure of fluid in valve chamber 39. The piston 38 will then be quickly shifted to its outer seat. The piston chamber 37 is open to the atmosphere through port 68, and with the piston 38 seated on the seat ring 43, the area of the piston outside of the seat ring is open to piston chamber 37 by way of a feed groove 69, so that possible leakage of fluid past the seat ring 43 will not build up the pressure on said area.

When the piston 38 is moved to its outer position, a cavity 70 in the slide valve 40 connects pipe 49 with a pipe 71, so that the reduction limiting reservoir 48 is connected to the pipe 71. Pipe 71 is connected to a passage 72 leading to the seat of slide valve 26, and in the application position of said slide valve, the passage 72 is connected through cavity 59, with passage 60. The fluid pressure in the equalizing reservoir 14 will now equalize into the reduction reservoir 48, and the reduction in fluid pressure thus produced in chamber 13, causes the piston 12 to be operated by brake pipe pressure in chamber 16 to unseat the discharge valve 19, and thereby permit fluid under pressure to be vented from the brake pipe 18.

When the brake pipe pressure has been thus reduced to a degree slightly less than the pressure in chamber 13 and in the equalizing reservoir 14 has been reduced by equalization into the reduction limiting reservoir 48, the piston 12 will be operated to seat the discharge valve 19, and thus cut off the further venting of fluid from the brake pipe.

It will now be evident that with my invention, when the automatic train control apparatus operates to effect an application of the brakes, the initiation of the reduction in brake pipe pressure is delayed for a time, by operation of the delayed application valve device 4, while during this delay period, the brakes are applied to some extent, through leakage from the brake pipe, which reduces the brake pipe pressure when the feed of fluid under pressure is automatically cut off at the brake valve device, in the manner as hereinbefore described.

While one illustrative embodiment of the invention has been described in detail, it is not my intention to limit its scope to that embodiment or otherwise than by the terms of the appended claims.

Having now described my invention, what I claim as new and desire to secure by Letters Patent, is:

1. In a fluid pressure brake apparatus, the combination with a brake pipe and means for normally maintaining the brake pipe charged with fluid under pressure, of means for automatically effecting a reduction in brake pressure and for cutting off the supply of fluid under pressure to the brake pipe, and means for delaying the initiation of the automatic brake application for a predetermined period of time, the brakes being initially applied during said period of time by the reduction in brake pipe pressure due to leakage from the brake pipe.

2. The method of applying the brakes by reducing the brake pipe pressure which consists in first cutting off the supply of fluid under pressure to the brake pipe, so that the brake pipe pressure is reduced by leakage from the brake pipe, and then, after a predetermined period of time, effecting a predetermined reduction in brake pipe pressure.

3. The combination with a fluid pressure brake apparatus including a brake pipe and means for normally supplying fluid under pressure to the brake pipe, of means operated automatically for effecting a reduction in brake pipe pressure and for cutting off the supply of fluid to the brake pipe, and means for delaying the start of said reduction in brake pipe pressure for a period of time, the brake pipe pressure being reduced by leakage from the brake pipe during said period of time.

4. The combination with a fluid pressure brake apparatus including a brake pipe and means for normally supplying fluid under pressure to the brake pipe, of an equalizing reservoir, valve means operated upon a reduction in pressure in the equalizing reservoir for effecting a reduction in brake pipe pressure, valve means operated automatically for venting fluid from said equalizing reservoir, valve means for automatically cutting off the supply of fluid to the brake pipe, and a valve device operative to delay the start of said venting of fluid from the brake pipe, the brake pipe pressure being reduced during the delay period by leakage of fluid from the brake pipe.

5. The combination with a fluid pressure brake apparatus including a brake pipe and means for normally supplying fluid under pressure to the brake pipe, of an equalizing reservoir, valve means operated upon a reduction in pressure in the equalizing reservoir for effecting a reduction in brake pipe pressure, a reduction limiting reservoir, an application valve device operated automatically to connect said limiting reservoir with the equalizing reservoir, a timing reservoir, a delay valve device operated upon a predetermined increase in fluid pressure in the timing reservoir for establishing communication through which said limiting reservoir is connected to said equalizing reservoir, means controlled by said application valve device for cutting off the supply of fluid under pressure to the brake pipe, said application valve device being adapted in application position to supply fluid under pressure to said timing reservoir.

In testimony whereof I have hereunto set my hand, this 7th day of February, 1930.

JOHN N. GOOD.